AMPLITUDE LIMITER

Filed Dec. 5, 1944 2 Sheets-Sheet 1

INVENTOR
EDWARD W. HEROLD.
BY H. S. Grover
ATTORNEY

March 6, 1951 E. W. HEROLD 2,544,226

AMPLITUDE LIMITER

Filed Dec. 5, 1944 2 Sheets-Sheet 2

INVENTOR
EDWARD W. HEROLD.
BY H. S. Grover
ATTORNEY

Patented Mar. 6, 1951

2,544,226

UNITED STATES PATENT OFFICE 2,544,226

AMPLITUDE LIMITER

Edward W. Herold, Kingston, N. J., assignor to Radio Corporation of America, a corporation of Delaware Application December 5, 1944, Serial No. 566,747

11 Claims. (Cl. 178—44)

My present invention relates generally to amplitude limiters, and more particularly to a novel method of, and means for, limiting the amplitude of high frequency signal waves.

In radio frequency communication systems it is frequently desirable to incorporate a device, commonly known as a limiter, which limits the amplitude of the receiver output signal to a fixed value independent of the receiver input signal amplitude variation. For example, in the reception of frequency modulated (FM) carrier waves it is found that a substantial reduction in undesired interference and noise is achieved if all amplitude variations can be eliminated before FM detection. This is true, because while the intelligence is transmitted by carrier frequency variations independently of amplitude the undesired interference and noise are present chiefly as variations in amplitude of the carrier.

One method of maintaining a radio receiver system with an output intensity substantially independent of the input amplitude consists in the application of automatic volume control (AVC) voltage to an amplifier, as is commonly done in radio receivers. An AVC circuit, however, is operative only under steady-state conditions, because of the time delay inherent in the control circuit. It is not desirable to reduce the time delay indefinitely, because uncontrollable oscillation would result. As a result, rapid amplitude variations of the carrier are transmitted without reduction, and such controlled systems may be used for the reception of amplitude modulated carrier waves. For this reason, it is not possible to achieve appreciable noise reduction by the use of automatic volume control in a frequency modulation receiver.

Still another method of obtaining amplitude limiting action consists in the use of the voltage drop across a resistor to limit an electrode potential applied to a vacuum tube, as, for example, by the use of a high series resistor in the signal input grid circuit of a tube. Limiting obtained by such means is not feasible at higher frequencies (such as those normally used in radio receivers), because of unavoidable capacitive reactances. In the example of the series grid resistance, a degree of limiting is possible at higher frequencies, however, by shunting the resistance with a small capacitance. Again, although good steady-state performance is achieved, rapid carrier amplitude fluctuations are not completely eliminated. The reaction time of the grid resistance and its associated capacitances, furthermore, is not usually the same for a sudden drop in amplitude as it is for a sudden rise in amplitude. The instantaneous limiting action is not satisfactory, although a moderate degree of noise reduction is possible with this method in a frequency modulation receiver. Most of the forms of amplitude limiter which have been proposed in the past are subject to limitations similar to those enumerated above.

An important object of my present invention is to provide an arrangement including an electron discharge device which achieves amplitude limiting, and which is, in most practical cases, instantaneous in action and free from the aforementioned objections of other methods of limiting.

It is well known that the maximum current which may be passed through a high-vacuum electron discharge device is inherently limited by space charge to a definite value which depends on electrode potentials. In my invention such inherent limitation of current is used in a novel manner for the purpose of limiting the maximum output of a vacuum tube.

An important object of my invention is to provide an electron discharge device for limiting the output amplitude of substantially sinusoidal input signals; said device having input terminals for the application of said signals and output terminals whose current variations are used for obtaining the said amplitude limited output; the characteristic of the device being such that the fundamental component of the output current wave reaches its final limiting value for input signal amplitudes less than required for the production of substantially square waves of output current.

Another object of my invention is to provide an electron discharge device for amplitude limiting having an input electrode and an output electrode, and having such a characteristic when a sinusoidal input voltage is applied that the fundamental component of the output electrode current is substantially constant over all values of input voltage including those less than required for the production of substantially square waves of output current.

Another object of my invention is to provide a method of, and means for, automatically controlling the shape of a limiting characteristic in response to variations in average signal level thereby to provide substantially perfect instantaneous limiting action.

In the drawings:

Fig. 1 shows a limiter characteristic which is ideal, and should be approached as closely as possible;

Fig. 2*a* shows two practicable forms of limiter characteristic, either of which is attained by the invention;

Fig. 2*b* shows the input vs. output characteristics of a limiter corresponding to the two types of characteristics shown in Fig. 2*a*;

Figure 7:
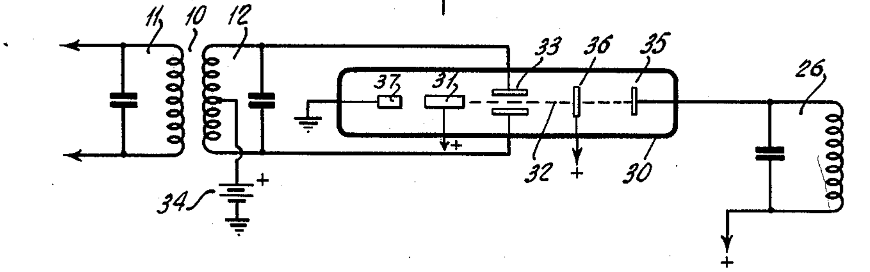
Figure 8:
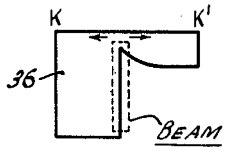
Figure 9:
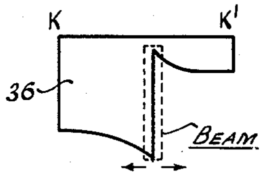

Fig. 7 schematically shows a modified form of the amplitude limiter tube;

Fig. 8 shows a form of intercepting shield which can be employed in the tube of Fig. 7;

Fig. 9 shows a modification of the interception shield; and

Figure 10:
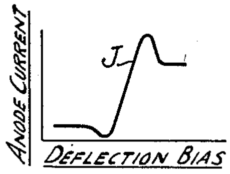

Fig. 10 shows schematically the limiting characteristic secured when utilizing a limiter tube employing the shield of Fig. 9.

Figures 1, 2A, 2B, 3, 4A, 4B, 4C, 5:
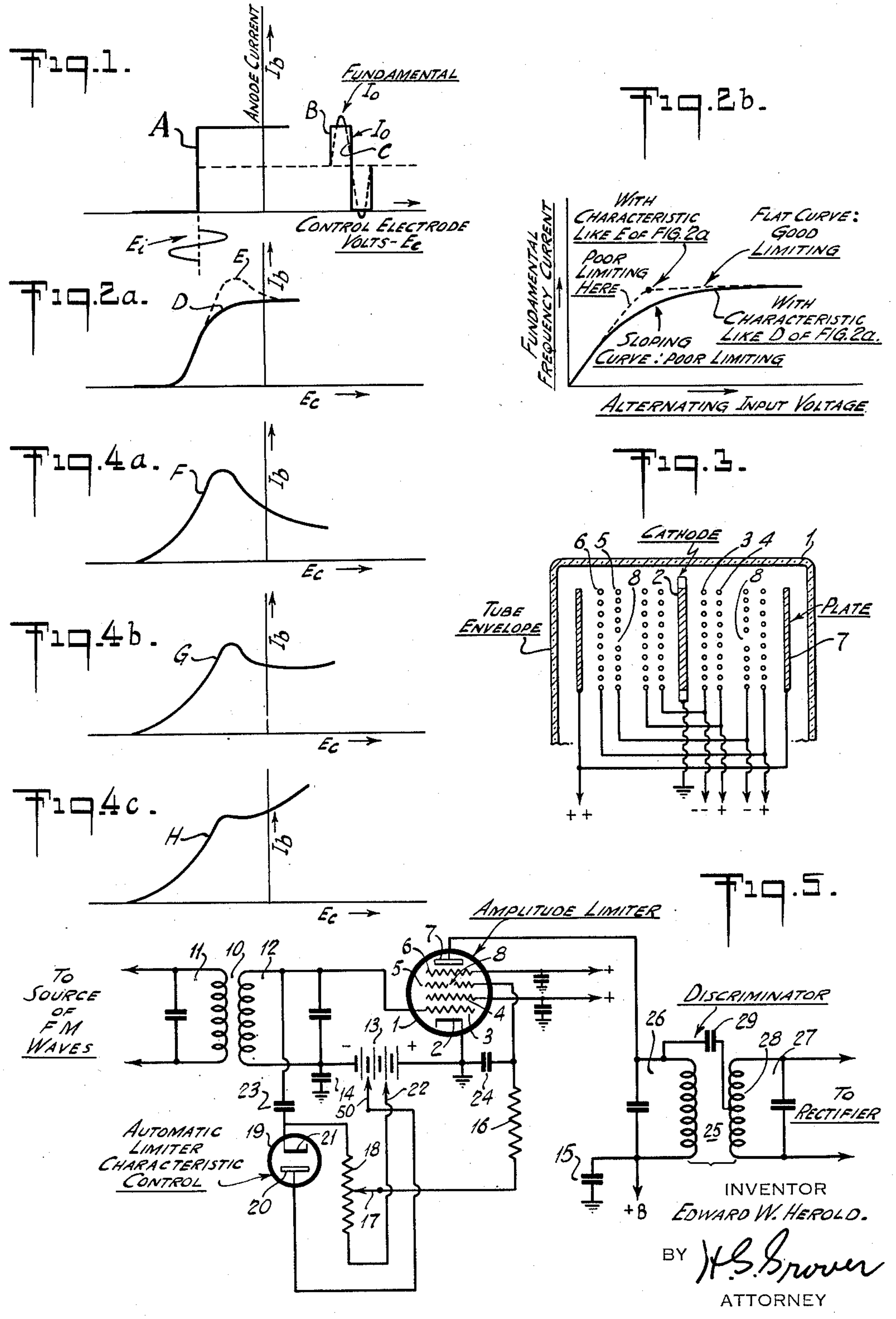
Fig. 3 shows a cross-sectional view, partly schematic, of one form of tube constructed according to the invention.
Figs. 4a, 4b and 4c show respectively different characteristics typical of a tube made as in Fig. 3.
Fig. 5 shows a part of an FM receiver embodying the invention, the tube of Fig. 3 being schematically shown.

Referring now to the accompanying drawing, wherein like reference characters in the different figures designates similar circuit elements, it will be obvious that an electron discharge tube which has a characteristic curve of output current ($I_b$) vs. input electrode voltage ($E_c$) similar to curve A of Fig. 1 will function as an ideal amplitude limiter when operated at the point indicated. As shown in Fig. 1, the application of a sinusoidal input voltage $E_i$ of any amplitude whatever will result in an output current $I_o$ whose wave shape will be similar to the curve B of Fig. 1, i. e., a square wave. If a selective circuit transmitting only the fundamental frequency (and frequencies near it) is inserted in the plate circuit of such a tube, only the amplitude of the fundamental component of current is effective in establishing an output voltage. With such a square wave of current, this fundamental current component will have a maximum value about 27% greater than the total current, and is represented by the dotted line curve C in Fig. 1. Since the total current is independent of the magnitude of the input alternating voltage, the amplitude of any component is also constant and perfect limiting is achieved. It should be noted that intelligence represented by frequency changes in the input wave is still present in the output current.

In a practical tube it is not usually possible to attain the ideal and perfect characteristic represented by curve A of Fig. 1. However, an approach to an ideal characteristic may be secured, and usually the resulting characteristic is represented by curve D of Fig. 2a. An analysis shows that a tube with an $I_p$ vs. $E_c$ characteristic similar to curve D of Fig. 2a gives a fundamental component of output current which approaches independence of input voltage at very large amplitudes of input, as would be expected. For smaller values of input voltage the fundamental component of current decreases, until at very small inputs the tube no longer acts as a limiter. In a limiter, it is advantageous to have a condition of nearly perfect limiting at as small an input voltage as possible.

This may be achieved by a characteristic such as is ideally represented by the dotted line curve E of Fig. 2a which differs from curve B in that as $E_c$ is increased, the curve rises to a maximum, then slopes downward, and finally flattens out. The fundamental output current of such a tube is greater at small voltage inputs than for a tube with a characteristic similar to curve D. At large voltage inputs the fundamental output from both tubes is the same. The voltage input vs. output current curve has, therefore, more nearly zero slope with a tube having the characteristic E than with one having characteristic D. This is shown in Fig. 2b where the input vs. output curves resulting from the two characteristics D and E are shown. In Fig. 2b there is plotted "Alternating Input Voltage" against "Fundamental Frequency Current." The solid line curve corresponds to characteristic D of Fig. 2a, while the dotted line curve corresponds to characteristic E of Fig. 2a. The tube of my present invention can be made to have a characteristic resembling either of curves D or E of Fig. 2a, when properly operated. This advantage is not shared by many previously known forms of limiter which have characteristics that approach characteristic D only.

A vertical cross-sectional view of one embodiment of an electron discharge tube suitable for use in my invention is shown in Fig. 3. The tube envelope 1 in Fig. 3 may be of glass or metal. It is shown broken away at the lower end thereof. The electrodes of the tubes are schematically represented. Those skilled in the art of constructing electron discharge tubes will be fully cognizant of the manner of manufacturing the tube to be described. It is to be understood that the tube of Fig. 3 is only an example of the invention. The cold electrodes are all concentrically located relative to the vertical cathode 2. The cathode 2 is surrounded by four concentric, foraminous, cold electrodes and an output plate or anode.

The first electrode 3 surrounding the cathode 2 is a control, or signal, electrode on which is impressed the input signal whose amplitude is to be limited. A suitable negative bias voltage is, also, shown applied to electrode 3. The next adjacent electrode 4 is an accelerating electrode which is operated at a constant positive potential with respect to the cathode. The electrode 4 serves to establish a sufficiently positive field to draw electrons from the cathode when the potential or electrode 3 is not too negative. Electrode 5 is a retarding electrode which is connected to a constant source of potential having a value not greatly different from that of the cathode, and preferably slightly negative with respect to it. Electrode 6 is a second accelerating electrode, and is operated at a constant positive potential with respect to the cathode. The output anode or plate 7 is adapted to be connected to a signal output circuit, and has applied to it a constant positive source of potential which is preferably higher than that applied to electrode 6 in order to avoid the disturbing effects of secondary electron emission. Alternatively, of course, an additional suppressor electrode (not shown) could be used for the reduction of secondary emission effects.

The amount of current leaving the cathode of the tube of Fig. 3 is determined by the instantaneous value of the potential of electrode 3 which is varied by the incoming signal. This current increases with increasing potential on electrode 3. By "increase" is meant in a positive potential sense. The electrons comprising the current pass through electrode 4 and enter the retarding field between electrodes 4 and 5, where they are slowed down. The space charge resulting from large numbers of electrons at low velocities serves considerably to lower the space potential between electrodes 4 and 5. As is well known, if a sufficient number of electrons (i. e., a sufficiently high current) is present, the space potential may fall to that of the cathode potential and many electrons will be slowed down to zero forward velocity and turned about.

The point at which the space potential is lowered to that of the cathode potential is called a "virtual cathode," and this phenomenon has frequently been studied experimentally and theoretically. As is also well known, a further increase of current, as caused by an increase in potential of electrode 3 beyond that necessary to produce a virtual cathode, results in a shift in position of this virtual cathode in a direction so as to permit less current to reach the anode 7. It is thus clear that with a uniformly increasing potential in a positive sense on electrode 3 the anode current will first rise, then reach a maximum, and decrease again. It will be noted, however, that electrode 5 has non-uniform openings. That is, the space 8 is provided along the turns. Hence, the current which will produce a virtual cathode at the end portion of the space between electrodes 4 and 5 is not yet sufficient to produce such a condition at the center portion in alignment with the relatively large space 8. As a result, the decrease in anode current is not as marked as would be found if electrode 5 were constructed uniform, and, under some conditions, only a small decrease in anode current may be obtained with a large increase in cathode current. The non-uniform section electrode 5 could, of course, be provided in any other manner, if desired. Indeed, space 8 could be provided at any point along the length of electrode 5.

Curves of output electrode current vs. input electrode voltage on tubes made similarly to that of Fig. 3 are shown in Figs. 4*a*, 4*b* and 4*c*. The respective $I_b$ vs. $E_c$ curves were obtained with different operating conditions on the same tube, and show the wide variety of useful characteristics which it is possible to obtain. Each of the three characteristics F, G and H of respective Figs. 4*a*, 4*b* and 4*c* has value in amplitude limiting, although as already mentioned curve G is probably the best for general use since it closely approaches curve E of Fig. 2*a*.

The utility of the curve E of Fig. 2*a* in an FM receiver is that, when a signal just too small to be adequately limited by curve D is received, curve E permits by virtue of its hump more output. Thus, when the output from curve D is decreasing due to too small a signal, the output of E remains high. In other words, the lower limit of signal level, sufficient to cause good limiting, is less with curve E than with D. To make this still more clear, suppose a limiter of type D requires 2 volts to swing it well up, so as to produce nearly constant output. The receiver designer puts in, say, a gain of 100,000 so that the antenna voltage needed is 2/100,000 or 20 $\mu$v. as a minimum. When the antenna voltage is less, say 10 $\mu$v., the limiter voltage is only 1 volt and the output of the limiter is less than for 2 volts, i. e., the output varies with input and is decreasing as the input decreases. This means inadequate limiting. Curve E, however, can be made so that the 1 volt input produces just as much output as the 2 volt, or even a 10 volt input. Thus, if the receiver designer wishes, he need use a gain of only 50,000 to handle a 20 $\mu$v. signal. Alternatively he may retain his amplifier of gain 100,000 and he will have adequate limiting for the 10 $\mu$v. signal which did not work for curve D. Curve F of Fig. 4*a* is produced by a more negative bias on grid 5 of the tube of Fig. 3. Curve H of Fig. 4*c* is produced with less negative bias on grid 5. It has relatively little utility at present, because of the top upwardly-sloping part of the curve. Curve G is probably an optimum.

It has been found possible to control the shape of the limiting characteristic to some extent by adjustment of the potential of one electrode such as, for example, electrode 5 of Fig. 3. It is possible to make use of this adjustment to control the $I_b$ vs. $E_c$ characteristic automatically so as more nearly to approach perfect instantaneous limiting even with wide variation of average signal level. This may be done when the average signal input amplitude varies relatively slowly compared to the instantaneous changes in amplitude, as with some types of carrier fading. The potential of the electrode controlling the limiting characteristic is then varied automatically in accordance with slow average carrier amplitude variations. For this purpose there may be used some form of control similar to that known as automatic volume control (AVC) in conventional radio broadcast receivers.

In Fig. 5 I have shown a receiving system of angle modulated carrier waves embodying a limiter circuit constructed in accordance with the principles of my invention. The term "angle modulated" is generic, and includes frequency modulation (FM), phase modulation (PM) or hybrid modulation possessing characteristics common to both FM and PM. For the sake of simplicity let it be assumed that the receiver is of the superheterodyne type, is adapted to receive FM carrier waves in the 40–50 megacycle (mc.) range, and that the maximum frequency swing is 150 kilocycles (kc.) at the transmitter. Those skilled in the art of FM communication know that the FM transmitter carrier is deviated in frequency from its normal frequency to an extent dependent on the modulation signal amplitude, while the rate of deviation is dependent on the modulation signal frequencies per se.

The permitted deviation in the present FM band of 40–50 mc. is ±75 kc. The invention is not limited to the specific frequencies or ranges mentioned. The collected FM carrier waves are reduced in frequency to the operating intermediate frequency (I. F.) value. The latter may be 4.3 mc. by way of specific example. The networks prior to the limiter tube 1 may be those which are suitable for FM reception in a superheterodyne receiver. The selector circuits between tubes should pass the maximum frequency swing of the waves, and may desirably have pass bands about 200 kc. wide. Thus, the numeral 10 denotes the I. F. band pass transformer whose primary circuit 11 and secondary circuit 12 are each tuned to 4.3 mc. The pass band of network 11, 12 is 200 kc. It will be understood that circuit 11 is arranged in the plate circuit of the last I. F. amplifier tube, or in the plate circuit of the converter tube.

The limiter tube 1 has its electrodes corresponding to the sectioned tube shown in Fig. 3. The cathode 2 is grounded, and the signal control electrode or grid 3 is connected to the high alternating potential side of input circuit 12. The source 13 of negative biasing voltage is shown establishing grid 3 at a suitable negative bias. The low potential side of circuit 12 is connected to ground for I. F. currents by condenser 14. Grids 4 and 6 are at positive potentials, and are suitably bypassed to ground for I. F. currents. Plate 7, which is at +B potential, is returned to ground for I. F. currents by condenser 15.

The grid 5 provided with space 8 is located between grids 4 and 6, and is connected by resistor 16 and slider 17 to a suitable point on resistor 18. The latter resistor is the load resistor of diode rectifier 19 whose anode 20 is connected to slider 50 on current source 13. An initial negative bias for grid 5 is provided by adjustable slider 22 from the lower end of resistor 18 to a suitable point on current source 13. If slider 50 is at a more negative points than slider 22 with respect to ground on source 13, a degree of delay bias for the anode 20 of diode 19 is provided. Resistor 18 is connected in the diode space current path, the I. F. signal energy being applied to cathode 21 through condenser 23. The latter condenser has its input electrode connected to the grid side of input circuit 12.

The controlled grid 5 has its initial bias as provided by slider 22, and, in addition, is regulated in potential in accordance with variations of voltage across resistor 18. The upper end of resistor 16 is connected to the grounded cathode by condenser 24. The resistor 16 and condenser 24 cooperate to provide a simple filter network to remove rapid fluctuations of voltage. The constants of the network 16, 24 are so chosen however, that the voltage of grid 5 will respond to any relatively slow changes in carrier amplitude occurring at transformer 10, such as when a strong and then a weak signal are tuned in. In other words, the diode 19 and its pertinent circuit elements act in the manner of delayed AVC. The amount of delay bias applied to the diode 19, as given by the voltage difference between sliders 22 and 50, determines the carrier amplitude level above which regulation takes place.

The relatively rapid variations in amplitude of the FM waves (whose center frequency is at I. F.) are substantially reduced by the tube 1 due to the action described in connection with Fig. 3. The amplitude limiting at the tube 1 is desirable, since the FM waves acquire considerable amplitude modulation due to a number of factors. For example, external electrical noise impulses, electron pulses (i. e. fluctuation noise) in the tubes, the selectivity of the cascaded selector circuits, fading; these are all factors creating amplitude modulation effects on the FM waves prior to FM detection. The latter employs a discriminator which functions to derive amplitude modulated wave energy from FM wave energy, but also responds over much of its characteristic to amplitude modulation, per se. Hence, any undesired amplitude modulation on the FM carrier prior to detection will show up in the discriminator output as a spurious and undesired component.

Hence, it is desirable to use an amplitude limiter prior to the discriminator thereby to eliminate the undesired amplitude modulation components. Only the discriminator section of the FM detector is shown, since the FM detector forms no part of the present invention. The discriminator may be of any suitable form well-known to those skilled in the art. That specifically shown is described and claimed by S. W. Seeley in U. S. Patent No. 2,121,203, granted June 21, 1938. It is sufficient for the purpose of this application to describe it as generally comprising a transformer 25 whose primary and secondary tuned circuits 26 and 27 are each tuned to the I. F. value, and the midpoint of secondary coil 28 is connected through blocking condenser 29 to the plate side of primary circuit 26. The opposite sides of secondary circuit 27 are connected to respective input electrodes of a pair of opposed rectifiers, whose rectified output voltages are differentially combined to provide a modulation signal voltage corresponding solely to the frequency deviations of the FM carrier waves.

As explained previously, the virtual cathode effect produced between the electrodes 4 and 5 is delayed or retarded at the space in the vicinity of opening 8. The characteristic of tube 1 will be similar to F or G depending on the potential of grid 5. The diode 19 in Fig. 5 rectifies the I. F. input signal whenever it exceeds the potential between tap 22 and tap 50, so that a direct current potential is then created across potentiometer resistor 18. An increase in the average value of the input signal above the point at which diode 19 conducts increases the direct current potential across resistor 18. By applying part of this potential to the retarding electrode 5 through resistor 16, the potential of electrode 5 is automatically varied with slow variations in the average value of the input signal. Rapid variations, of course, are not passed by the filter network 16, 24.

The polarity of the diode connection is such that an increase in average signal amplitude causes the potential of the grid 5 to become more positive. This, in turn, changes the limiter characteristic from one with a downward slope (as curve F of Fig. 4*a*) to a curve which is more nearly flat (as curve G or H of Figs. 4*b* and 4*c* respectively). Such a change is in the right direction to improve instantaneous limiting at any one average signal amplitude. Initial bias voltages on the signal electrode 3 and on the retarding electrode 5 are provided by current source 13 as heretofore explained. In many instances, sufficient limiting is obtained without the use of diode 19. In this case, grid 5 may be connected directly to slider 22 by adjustment of slider 17 to its lowest point and slider 22 is adjusted to give the characteristic G of Fig. 4*b*. In this case, the diode plays no part in the circuit and the tube characteristic closely resembles E of Fig. 2*a*.

Figure 6:
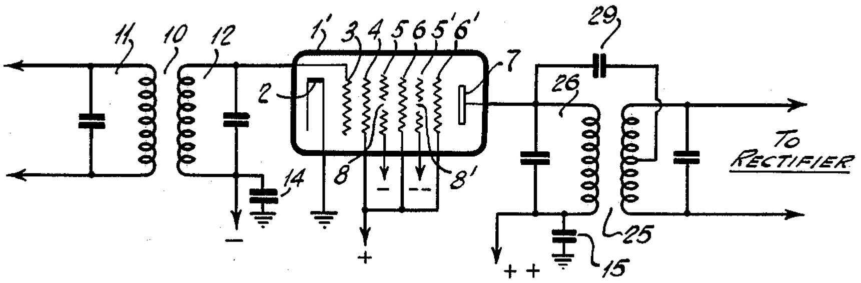
Fig. 6 is a circuit diagram of a modified amplitude limiter tube employing cascaded limiting.

It is frequently of advantage to obtain multiple limiting in the same electrode structure. This may be done by the use of two or more successive virtual cathodes along the path of the same electron stream. It has, also, been found advantageous to combine different forms of limiting in one tube, such as combined limitation due to saturated emission from a thermionic cathode or filament with virtual cathode limitation. In Fig. 6 I have shown multiple limiting performed in tube 1′, which generally is similar to the tube 1 shown in Fig. 5. The added electrodes are auxiliary retarding electrode 5′ and additional positive electrode 6′. Electrodes 4, 6 and 6′ are at a common positive potential, and retarding electrode 5′, which may have an opening 8′ similar to opening 8 of electrode 5, is at a more negative potential than grid 5.

The two negative retarding grids 5 and 5′ each have a virtual cathode on their side closest to the cathode by virtue of the spacings and potentials applied, and each retarding grid is provided with an opening 8 in the center thereof. Thus, the first virtual cathode region limits the current flow through grid 6, after which a second limiting action ahead of grid 5′ limits the current again which can flow to grid 6′ and anode 7. This is cascade limiting in an electronic sense of the term.

Another type of cascade limiting would involve the use of the tube shown in Fig. 3 at reduced filament voltage. This first limits the total available current after which retarding grid 5 again limits the electron current flow. In any of these arrangements it is desirable to insure the ultimate limiting characteristic to have the desired hump or peak as exemplified by curve E of Fig. 2*a*.

The desired limiter characteristic may be secured by means of a tube of the electron beam type. It is only necessary, in that case, to employ an intercepting electrode having a predetermined configuration correlated to the desired characteristic. In Fig. 7 I have shown an electron beam tube 30 which may be of the type generally disclosed in my U. S. Patent No. 2,294,659, granted September 1, 1942, and which uses a beam of rectangular cross-section. The function of tube 1 in Fig. 5 is performed by tube 30. Let it be assumed that the circuit of Fig. 5 has been altered by replacement of tube 1 by tube 30 of Fig. 7. The automatic control circuit associated with diode 19 is, also assumed removed from Fig. 7. The numerals 31 and 37 denote a suitable group of electrodes making up the "electron gun." The usual cathode, concentration and focussing electrodes make up the "electron gun," and for this reason the latter is schematically represented as a source of electrons 37 followed by electrodes 31, the electron gun emitting electrons in the form of a beam 32.

The deflection plates 33, between which the rectangular beam 32 passes in normal symmetry, are connected to respective sides of the input circuit 12. The midpoint of the input coil is shown connected to the positive terminal of a direct current biasing source 34. Hence, normally the plates 33 have equal attractive effects on the electron beam 32, and the beam is normally positioned midway between the plates 33. The anode 35 is connected to the high potential side of output circuit 26, and the beam falls on the anode to provide current flow through output circuit 26.

Control over the deflection plates in response to an input signal causes the beam to travel over the edge of intercepting electrode 36. The latter is shown, in Fig. 7, located broadside to the beam 32. That is, in Fig. 7 the end edge K—K' of electrode 36 is seen, as indicated in Figs. 8 and 9. The electrode 36 is given a positive bias.

In Fig. 8 there is shown the configuration of electrode 36 as seen from the direction of the beam 32. The beam cross-section is shown dotted, and its direction of travel is indicated by arrows. The shape of the electrode 36 shown in Fig. 8 will produce the form of characteristic shown in curve G of Fig. 4*b*, the deflection bias being $E_c$ in that case. The shape of electrode 36 shown in Fig. 9 will provide an "Anode Current vs. Deflection Bias" characteristic as illustrated by curve J in Fig. 10, which behaves similarly to curves E and G of Figs. 2 and 4 but is symmetrical.

The tube of Fig. 7 may advantageously be made so that the anode 35 has a high secondary emission ratio by proper choice of anode material. In this event, the anode potential may be slightly less than that of the intercepting electrode 36, and a multiplication of the output current occurs due to the large number of secondary electrons which leave the anode to be collected by electrode 36.

In a beam-deflection tube, of the type I have shown in Fig. 7, an extremely large input signal may swing the beam so far as to strike the walls of the tube or some other undesired tube part.

Ordinarily the limiter tube of my invention will be preceded by an amplifier whose overload point is such that this extreme signal condition is not encountered. However, if this is not so, the condition is easily and simply avoided by means well known in the art wherein AVC or preferably delayed AVC is applied to prior tubes in the amplifier chain. As heretofore explained, the AVC action will not effect instantaneous limiting, but it will protect the limiter tube from excessive input signals so that it may properly function as an instantaneous limiter. The addition of such an AVC system in no wise alters my basic invention and is not a part of it; thus it has not been shown in the figures.

While I have indicated and described several systems for carrying my invention into effect, it will be apparent to one skilled in the art that my invention is by no means limited to the particular organizations shown and described, but that many modifications may be made without departing from the scope of my invention as set forth in the appended claims.

What I claim is:

1. In a method of limiting the amplitude of output current resulting from sinusoidal input signals, the steps of producing a stream of electrons, controlling the electron stream in response to said signals, collecting said controlled stream to provide output current, producing a virtual cathode extending over a substantial portion only of the stream between the controlling point and the collecting point so that the virtual cathode is only partially effective to limit the output current amplitude whereby the characteristic relating output current to input signal variation possesses a peak prior to a final limiting value which is less than said peak value.

2. In a method of limiting the amplitude of output current resulting from sinusoidal input signals, the steps of producing a stream of electrons, controlling the electron stream in response to said signals, collecting said controlled stream to provide output current, producing a virtual cathode extending over a substantial portion only of the cross-section of the stream between the controlling point and the collecting point so that the virtual cathode is only partially effective to limit the output current amplitude whereby the characteristic relating output current to input signal variation possesses a peak prior to a final limiting value which is less than said peak value, and automatically regulating the shape of said characteristic by decreasing the number of electrons constituting the virtual cathode in response to relatively slow increases in input signal amplitude.

3. In a limiter tube of the type provided with at least a cathode, control grid, acceleration grid, retarding grid and anode in the order named, means for applying negative biases to the control grid and retarding grid, means for applying positive voltages to the acceleration grid and anode, said retarding grid having openings in an intermediate portion of said retarding grid which are wider than the openings in the remaining portion of said grid thereby to provide a virtual cathode area between the acceleration grid and the retarding grid which is more effective over said remaining grid portion.

4. In a limiter tube of the type provided with at least a cathode, control grid, acceleration grid, retarding grid and anode in the order named, means for applying negative biases to the control grid and retarding grid, means for applying positive voltages to the acceleration grid and anode, said retarding grid having openings in a center portion of said retarding grid which are wider than the openings in the remaining portion of said grid to provide a virtual cathode area between the acceleration grid and the retarding grid which is more effective over said remaining grid portion, and means providing between said retarding grid and anode a second virtual cathode area which is more effective over a substantial predetermined portion of said area than over the remaining portion thereof.

5. In a method of limiting the amplitude of output current resulting from sinusoidal input signals, the steps of producing a stream of electrons, controlling the electron stream in response to said signals, collecting said controlled stream to provide output current, producing a virtual cathode extending over a substantial portion only of the cross-section of the electron stream between the controlling point and the collecting point, and automatically controlling the number of electrons constituting the virtual cathode by decreasing or increasing said number in response to relatively slow increases or decreases in input signal amplitude.

6. An electron discharge device adapted for amplitude limiting and comprising a cathode, a control grid, an anode and electrode means positioned between said control grid and said anode for providing a virtual cathode between said control grid and said anode, said electrode means including a retarding grid having a variably spaced grid winding to provide wider openings over a predetermined portion of said retarding grid than over the remaining portion thereof, whereby a sinusoidal input voltage impressed on said cathode and control grid will produce an anode current having a fundamental component which is substantially constant over all values of input voltage including those less than required for the production of substantially square waves of anode output current.

7. An electron discharge device adapted for amplitude limiting and comprising a cathode, a control grid, an anode and electrode means positioned between said control grid and said anode for providing a virtual cathode between said control grid and said anode, said electrode means including a retarding grid having a variable pitch grid winding to provide wider openings over a predetermined portion of said retarding grid than over the remaining portion thereof, and a voltage supply for maintaining said retarding grid at a voltage which is negative with respect to that of said cathode, whereby a sinusoidal input voltage impressed on said cathode and control grid will produce an anode current having a fundamental component which is substantially constant over all values of input voltage including those less than required for the production of substantially square waves of anode output current.

8. An electron discharge device adapted for amplitude limiting and comprising a cathode, a control grid, an anode and electrode means positioned between said control grid and said anode for providing a virtual cathode between said control grid and said anode, said electrode means including two accelerating grids and a retarding grid positioned between said accelerating grids, said retarding grid having openings in a center portion thereof which are wider than the openings in the remaining portion thereof, and a voltage source for supplying potentials to said accelerating grids which are positive with respect to that of said cathode and for supplying a potential to said retarding grid which is negative with respect to that of said cathode, whereby a sinusoidal input voltage impressed on said cathode and control grid will produce an anode current having a fundamental component which is substantially constant over all values of input voltage including those less than required for the production of substantially square waves of anode output current.

9. In combination with a source of frequency modulated waves, an amplitude limiter comprising a vacuum discharge tube having a cathode, a control grid, an anode and a retarding grid, said retarding grid having a variable pitch grid winding to provide wider openings over a predetermined portion of said retarding grid than over the remaining portion thereof and to exhibit a non-uniform control effect on the electron stream of said tube, and a source of power for applying a bias voltage to said retarding grid which is negative with respect to that of said cathode to provide a limiter characteristic which rises to a peak and thereafter decreases again.

10. In combination with a source of frequency modulated waves, an amplitude limiter comprising a vacuum discharge tube having a cathode, a control grid, an anode and a retarding grid, said retarding grid having a variable pitch grid winding to provide wider openings over a predetermined portion of said retarding grid than over the remaining portion thereof and to exhibit a non-uniform control effect on the electron stream of said tube, a voltage source for applying a bias voltage to said retarding grid which is negative with respect to that of said cathode to provide a limiter characteristic which rises to a peak and thereafter decreases again, and means responsive to relatively slow carrier amplitude changes for rendering said bias voltage more positive when said carrier amplitude increases.

11. In combination with a source of frequency modulated waves, an amplitude limiter comprising a vacuum discharge tube having a cathode, a control grid, an anode and a retarding grid, a voltage source for applying a bias voltage to said retarding grid which is negative with respect to that of said cathode to provide a limiter characteristic which rises to a peak and thereafter decreases again, and a unidirectionally conducting device coupled to said tube for rendering said bias voltage more positive when said carrier amplitude increases.

EDWARD W. HEROLD.

REFERENCES CITED

The following references are of record in the file of this patent:

UNITED STATES PATENTS

| Number | Name | Date |
|---|---|---|
| 1,757,345 | Strobel | May 6, 1930 |
| 2,226,752 | Eaglesfield | Dec. 31, 1940 |
| 2,262,406 | Rath | Nov. 11, 1941 |
| 2,306,457 | Mayne | Dec. 29, 1942 |
| 2,324,090 | Lange | July 13, 1943 |
| 2,357,405 | Katzin | Mar. 11, 1944 |
| 2,395,615 | Curtis | Feb. 26, 1946 |

FOREIGN PATENTS

| Number | Country | Date |
|---|---|---|
| 559,218 | Great Britain | Feb. 9, 1944 |